US010642624B2

(12) United States Patent
Shanker et al.

(10) Patent No.: US 10,642,624 B2
(45) Date of Patent: May 5, 2020

(54) SYSTEM AND METHOD TO TRANSFORM AN IMAGE OF A CONTAINER TO AN EQUIVALENT, BOOTABLE VIRTUAL MACHINE IMAGE

(71) Applicant: Nutanix, Inc., San Jose, CA (US)

(72) Inventors: Rabi Shanker, Milpitas, CA (US); Prerna Saxena, Bangalore (IN); Raghu Prasad Rapole, Telangana (IN)

(73) Assignee: NUTANIX, INC., San Jose, CA (US)

( * ) Notice: Subject to any disclaimer, the term of this patent is extended or adjusted under 35 U.S.C. 154(b) by 358 days.

(21) Appl. No.: 15/884,837

(22) Filed: Jan. 31, 2018

(65) Prior Publication Data
US 2019/0235879 A1 Aug. 1, 2019

(51) Int. Cl.
*G06F 9/4401* (2018.01)
*G06F 9/455* (2018.01)
*G06F 9/445* (2018.01)

(52) U.S. Cl.
CPC ........ *G06F 9/4406* (2013.01); *G06F 9/45558* (2013.01); *G06F 9/44505* (2013.01); *G06F 2009/45562* (2013.01); *G06F 2009/45575* (2013.01); *G06F 2009/45595* (2013.01)

(58) Field of Classification Search
CPC ............. G06F 9/44505; G06F 9/45558; G06F 2009/45575; G06F 9/4406; G06F 2009/45562; G06F 2009/45595
USPC ........................................................ 713/1, 2
See application file for complete search history.

(56) References Cited

U.S. PATENT DOCUMENTS

| 8,549,518 | B1 | 10/2013 | Aron et al. | |
|---|---|---|---|---|
| 8,601,473 | B1 | 12/2013 | Aron et al. | |
| 8,850,130 | B1 | 9/2014 | Aron et al. | |
| 9,772,866 | B1 | 9/2017 | Aron et al. | |
| 2017/0277524 | A1* | 9/2017 | Bhat | G06F 8/60 |
| 2017/0371693 | A1* | 12/2017 | Corrie | G06F 9/45558 |
| 2018/0088973 | A1* | 3/2018 | Subhraveti | G06F 9/445 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Ji H Bae
(74) *Attorney, Agent, or Firm* — Foley & Lardner LLP

(57) ABSTRACT

A system and method include creating a bootable virtual machine (VM) image for a container image. The method includes a controller machine creating a single partition within an output VM disk file where the single partition comprises a master boot record and a partition table, forming a valid file system in a main partition of the output VM disk file, arranging an input set of container image definitions as a list where a base image forms a head of the list and subsequent images follow in the list, sequentially processing the list for each image by adding the input set of container image definitions to the output VM file; and applying a final networking configuration over the output VM file.

23 Claims, 5 Drawing Sheets

(56) References Cited

OTHER PUBLICATIONS

Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Cano, Ignacio, et al. "Curator: Self-Managing Storage for Enterprise Clusters" (Mar. 27, 2017), from https://www.usenix.org/conference/nsdi17/.

* cited by examiner

SYSTEM AND METHOD TO TRANSFORM AN IMAGE OF A CONTAINER TO AN EQUIVALENT, BOOTABLE VIRTUAL MACHINE IMAGE

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines (VMs) concurrently. The one or more VMs utilize the hardware resources of the underlying one or more host machines. Each VM may be configured to run an instance of an operating system (OS). Modern virtual computing systems allow several OSes and several software applications to be safely run at the same time on the VMs supported by a single host machine, thus increasing resource utilization and performance efficiency.

SUMMARY

OS level virtualization can include a method utilized in which a kernel of an OS permits multiple isolated user space instances of collections of processes (e.g., programs, applications, services, etc.). These instances are often referred to as "containers," "software containers," "virtualization engines," or "jails" (e.g., FreeBSD jails or chroot jails). As such with OS level virtualization, an OS can behave and/or appear like multiple different, individual systems.

Containers are immensely popular owing to their lightweight running footprint as well as due to the ease of deployment accorded by overlaying pre-existing images to create new container images. Regardless of the advantages of containers, however, they have not obsoleted VMs that still continue to be trusted, secure entities for running production workloads. The disclosure describes a method to transform a container image into a bootable virtual hard disk of a VM, which may subsequently be deployed on an existing cloud platform.

Previous implementations generally depend on the use of an initial bootable VM image corresponding to the base container image; and they focus on applying transformations to this existing base VM image as required by the container definition to arrive at an equivalent final VM image.

The disclosure describes a method to transform a container image into a bootable virtual hard disk of a VM, which may subsequently be deployed on an existing cloud platform. The method takes a chain of container definitions including the definition of the base image, a valid filesystem relevant for that container image, a set of protected packages that are essential for a VM to boot (but optional, and hence removed for a container such as a kernel, bootloader, initscripts, etc) and required networking configuration for the application. From these inputs, a file with a bootable VM disk can be created.

In accordance with at least some aspects of the present disclosure, a method is disclosed. The method includes creating a bootable VM image for a container image. The method includes a controller machine creating a single partition within an output VM disk file (e.g., a VMdisk file) where the single partition comprises a master boot record and a partition table, forming a valid file system in a main partition of the output VM disk file, arranging an input set of container image definitions as a list where a base image forms a head of the list and subsequent images follow in the list, sequentially processing the list for each image by adding the input set of container image definitions to the output VM file; and applying a final networking configuration over the output VM file.

In accordance with some other aspects of the present disclosure, a system that creates a bootable VM image from a container image is disclosed. The system includes a controller and a memory coupled to the controller and configured to store programmed instructions and an output VM disk file. The controller is configured to create a single partition within the output VM disk file, form a valid file system in a main partition of the output VM disk file, arrange an input set of container image definitions as a list where a base image forms a head of the list and subsequent images follow in the list, process the list for each image by adding the input set of container image definitions to the output VM file, and apply a final networking configuration over the output VM file.

In accordance with some other aspects of the present disclosure, a non-transitory computer readable storage medium is disclosed to store a computer program configured to execute a method for creating a bootable VM image from a container image. The method includes creating a single partition within an output VM disk file, forming a valid file system for a container image in a main partition of the output VM disk file, arranging an input set of container image definitions as a list, wherein a base image forms a head of the list and subsequent images follow in the list, processing the list for each image by adding the input set of container image definitions to the output VM file, and applying a final networking configuration over the output VM file.

The foregoing summary is illustrative only and is not intended to be in any way limiting. In addition to the illustrative aspects, implementations, and features described above, further aspects, implementations, and features will become apparent by reference to the following drawings and the detailed description.

Figure 1:
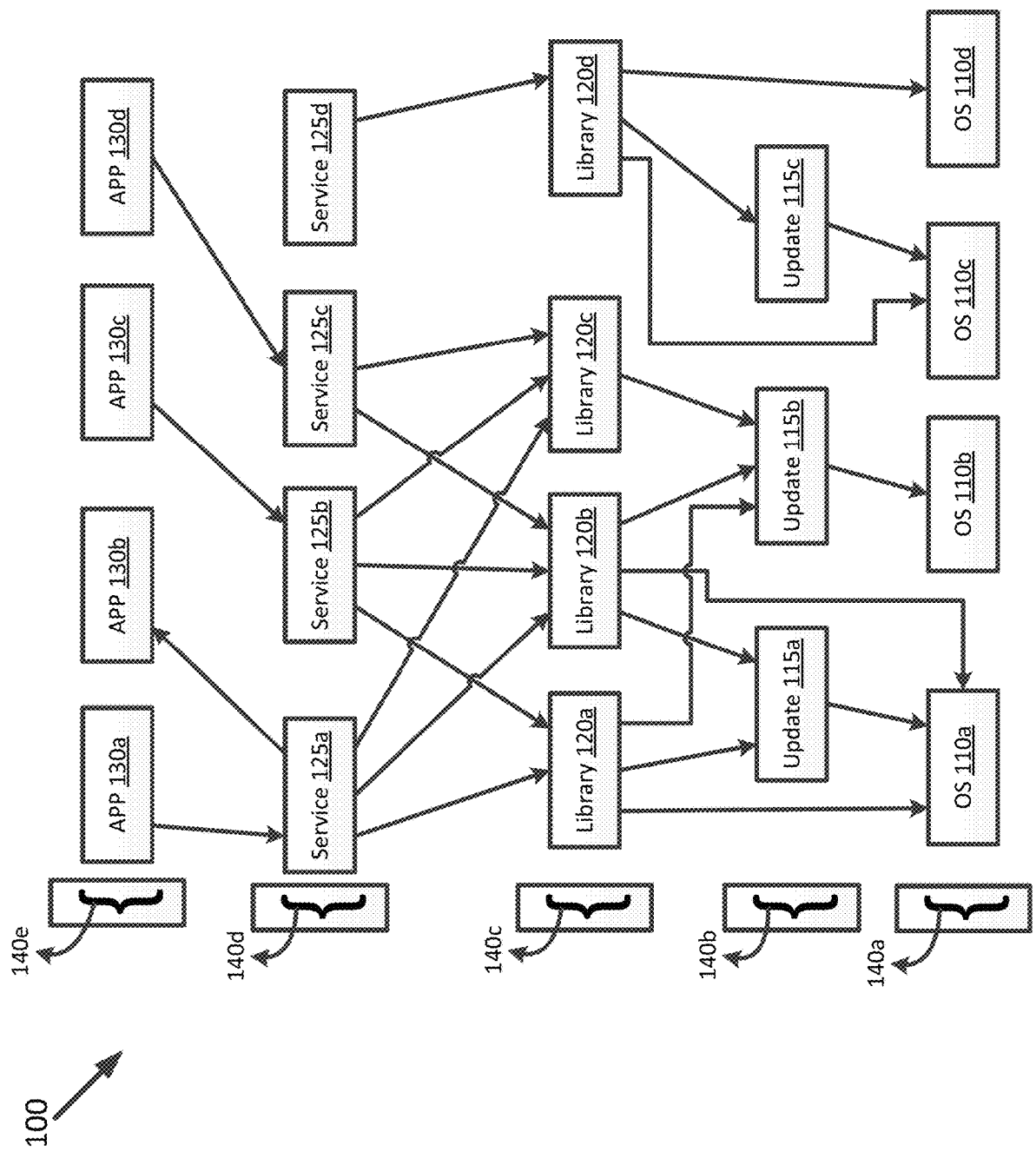
FIG. 1 is a block diagram illustrating a multi-rooted hierarchy of possible software stack elements, according to one or more implementations.

The foregoing and other features of the present disclosure will become apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In one or more implementations, OS level virtualization may utilize storage images. For example, one or more storage images may be combined with a base or root storage image in producing a software stack that may be utilized with OS level virtualization. In one instance, a web server storage image may be combined with an OS base or root storage image (e.g., a Linux OS, a Red Hat OS base or root storage image, an Ubuntu OS base or root storage image, a BSD OS base or root storage image, a Microsoft Windows OS base or root storage image, a real time OS base or root storage image, etc.). In another instance, a database server storage image may be combined with an OS base or root storage image (e.g., a Linux OS, a Red Hat OS base or root storage image, an Ubuntu OS base or root storage image, a BSD OS base or root storage image, a Microsoft Windows OS base or root storage image, a real time OS base or root storage image, etc.).

In one or more implementations, a combination of storage images utilizing OS level virtualization may resemble a service and/or an application with a full OS installation. For example, the combination of storage images utilizing OS level virtualization may include a file system and/or one or more environment variables. For instance, the combination of storage images utilizing OS level virtualization may appear to be self-sufficient. In one or more implementations, multiple combinations of storage images utilizing OS level virtualization may utilize a same kernel (e.g., a Linux kernel, a Solaris kernel, a BSD kernel, etc.) of a host OS of a host machine (e.g., a host computer system). For example, the multiple combinations of storage images utilizing OS level virtualization may concurrently utilize the same kernel of the host OS of the host machine. In one instance, a single processor of the host machine may execute the same kernel that is concurrently utilized by the multiple combinations of storage images utilizing OS level virtualization. In another instance, multiple processors of the host machine may execute the same kernel that is concurrently utilized by the multiple combinations of storage images utilizing OS level virtualization.

In one or more implementations, a kernel may maintain an isolation and/or a separation of processes (e.g., programs, applications, services, etc.) of a first combination of storage images utilizing OS level virtualization and processes of a second combination of storage images utilizing OS level virtualization while providing kernel services to the first combination of storage images and the second combination of storage images. In one example, one or more processes of the first combination of storage images may not access memory of the second combination of storage images. In a second example, one or more processes of the first combination of storage images may not access a file system of the second combination of storage images. In another example, a file system of the first combination of storage images may include identically named portions of a file system of the second combination of storage images, and if a process of the first combination of storage images reads from and/or writes to one of the identically named portions, the process of the first combination of storage images reads from and/or writes to the file system of the first combination of storage images. For instance, the file system of the first combination of storage images and the file system of the second combination of storage images may include "/var/lib/mysql/InventoryDatabase", and the process of the first combination of storage images reads from and/or writes to "/var/lib/mysql/InventoryDatabase" of the file system of the first combination of storage images and not to "/var/lib/mysql/InventoryDatabase" of the file system of the second combination of storage images.

In one or more implementations, a specification may describe multiple elements of a software stack. For example, the software stack may include two or more of a base OS, an update to the base OS, a library (e.g., an encryption library, an image manipulation library, a Lua library, a Python library, etc.), a service (e.g., a virtual private network service, a web service, a database service, a firewall service, etc.), and an application, among others. In one or more implementations, a specification may include configuration information. For example, the configuration information may include Docker configuration information. For instance, the Docker configuration information may include a Docker configuration file. In one or more implementations, a specification describing multiple elements of a software stack may be utilized in determining a combination of storage images that may be applied and/or provided to a VM. In one example, the specification describing multiple elements of the software stack may be a combination of storage images that utilizes virtual disk images. In another example, the specification describing multiple elements of the software stack may be a combination of storage images that utilizes OS level virtualization. For instance, the combination of storage images that utilizes OS level virtualization may include a combination of Docker images.

Turning now to FIG. 1, a multi-rooted hierarchy of possible software stack elements is illustrated, according to one or more implementations. As shown, a multi-rooted hierarchy 100 of possible software stack elements may include possible roots via OSes 110*a*-110*d*. For example, an OS of OSes 110*a*-110*a* may be selected for a software stack level 140*a*. For instance, an OS of OSes 110*a*-110*a* may include a Microsoft Windows OS, a Linux OS, a BSD OS, an Android OS, or a real time OS, among others. As illustrated, the hierarchy 100 may include possible updates 115*a*-115*c* that may be applied to possible OSes 110*a*-110*c*, corresponding to respective arrows. For example, one or more possible updates of updates 115*a*-115*c* may be selected from a software stack level 140*b*.

As shown, the hierarchy 100 may include possible libraries 120*a*-120*d*. For example, one or more libraries of libraries 120*a*-120*a* may be selected for a software stack level 140*c*. As illustrated, the hierarchy 100 may include possible services 125*a*-125*d*. For example, one or more services of services 125*a*-125*d* may be selected for a software stack level 140*d*. As shown, the hierarchy 100 may include possible applications (APPs) 130*a*-130*d*. For example, one or more APPs of APPs 130*a*-130*a* may be selected for a software stack level 140*e*.

As illustrated, a child node of the hierarchy 100 may point to one or more parent nodes of the hierarchy 100. For example, the parent nodes of the hierarchy 100 may be required such that one or more respective child nodes may function. In one or more implementations, the hierarchy 100 may include one or more properties of a graph. For example, service 125a may be a parent of application (APP) 130a and point to APP 130b. For instance, APP 130b may be at software stack level 140e and may be a plug-in for service 125a.

In one or more implementations, the hierarchy 100 may be stored via a data structure. For example, the data structure may be stored via a storage device (e.g., a volatile memory storage device, a non-volatile memory storage device, etc.). In one instance, the hierarchy 100 may be stored via a graph data structure. In another instance, the hierarchy 100 may be stored via a tree data structure.

Figure 2:
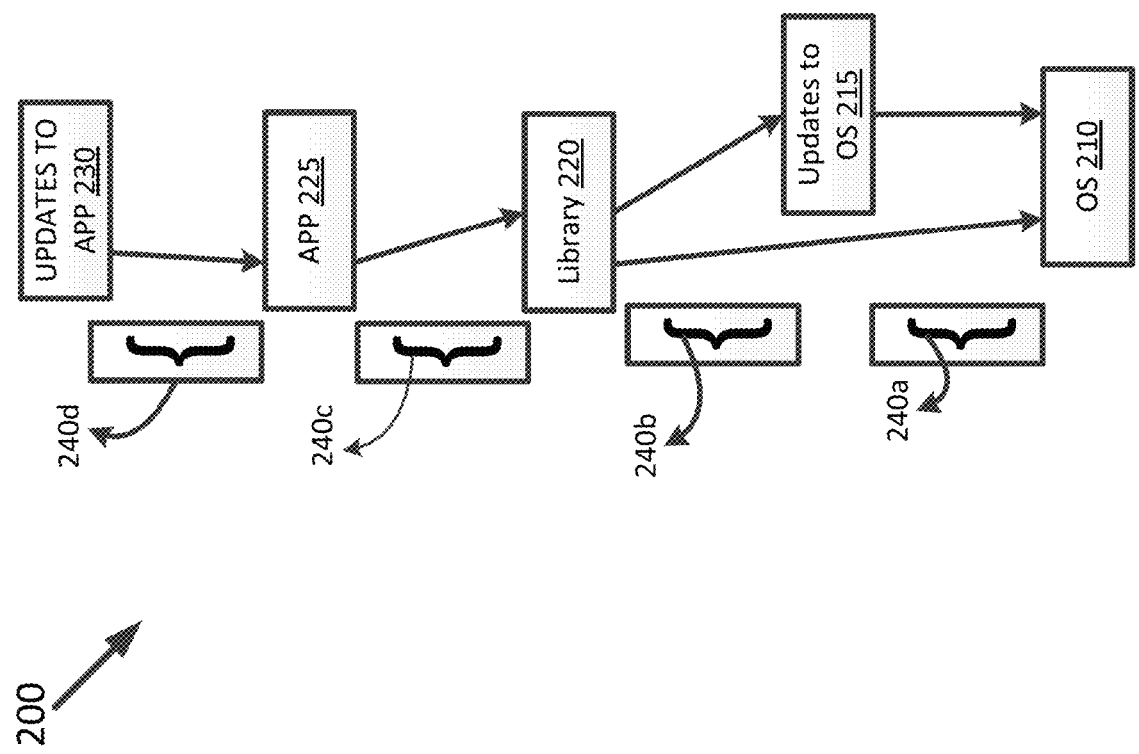
FIG. 2. is a block diagram of a container file system, in accordance with some implementations of the present disclosure.

FIG. 2 illustrates a container file structure 200 in accordance with an illustrative implementation. The container file structure 200 includes five layers referred to as layers 0, 1, 2, 3, and 4. Additional, fewer, or different layers may be included in container file structure 200 depending on the implementation. A base boot OS 210 is provided at a base layer 0. Updates to the OS 215 are at layer 1. Libraries 220 are at layer 2. An application 225 is at a layer 3 and updates to the application 230 are at a layer 4.

Advantageously, the files in each layer of the container file structure 200 only need to contain delta images consisting of the result of a diff operation with the preceding layer. Thus, updates to OS 215 in layer 1 only need to contain a difference 240a between the images of layer 0—the OS 210—and layer 1. Likewise, library 220 only needs to contain a difference 240b between itself and updates to OS 215. Application 225 includes a difference 240c between itself and library 220. Updates to app 230 can include a difference 240a between itself and application 225.

Figure 3:
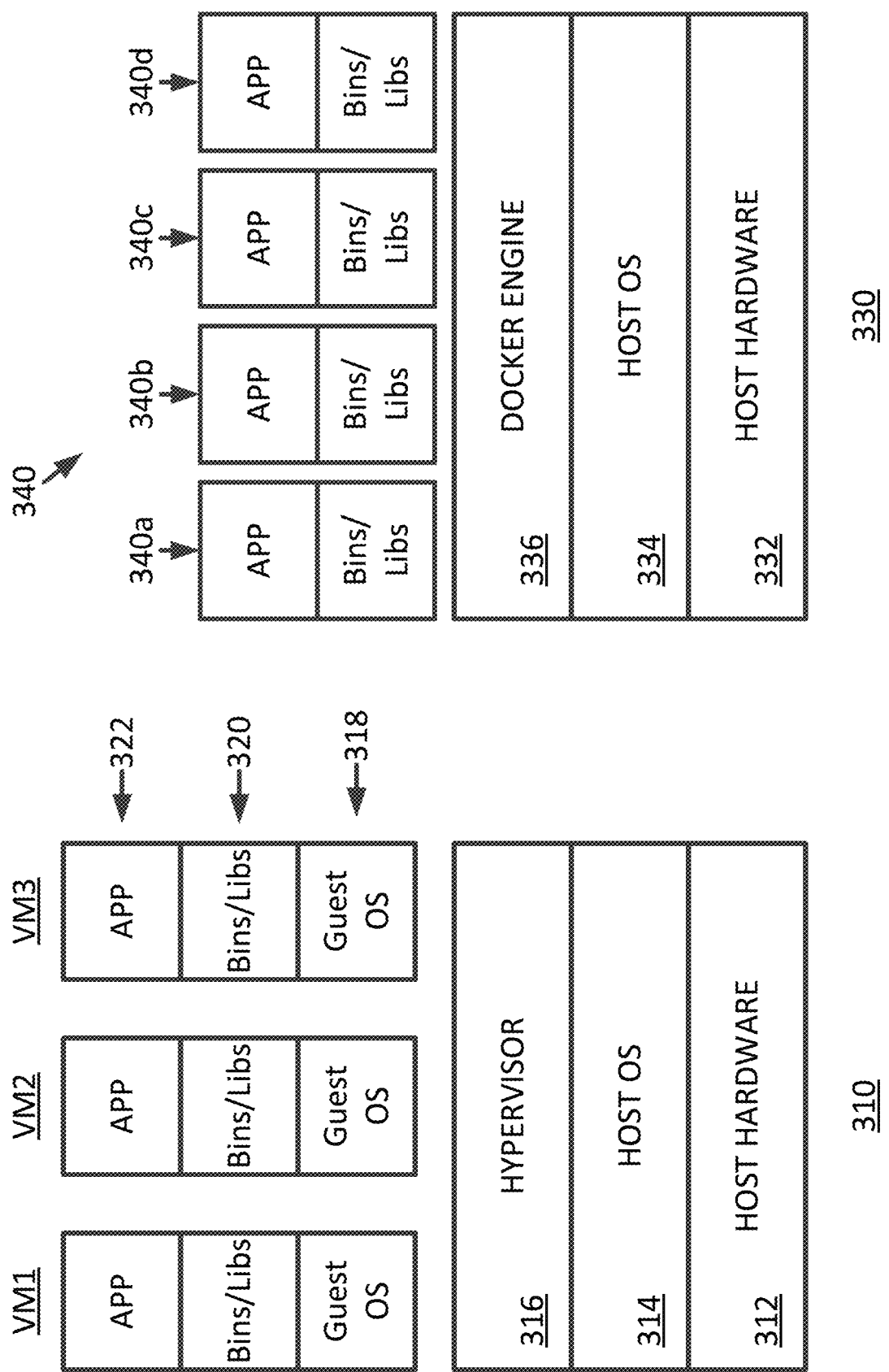
FIG. 3 is a block diagram of a VM system and a container machine system in accordance with implementations of the present disclosure.

FIG. 3 illustrates a VM system 310 and a container machine system 320. In an illustrative implementation, the VM system 310 includes a host hardware 312, a host OS or kernel 314, a hypervisor 316, and VMs VM1, VM2, and VM3. The hypervisor 316 interfaces with VMs including VM1, VM2, and VM3 to manage resources available from the host OS 314 and host hardware 312. Each of the VMs include guest OS 318, bins/libraries 320, and applications 322.

In comparison, the container system 330 includes host software 332, host OS 334, a docker engine 336, and a plurality of containers 340. The docker engine 336 interfaces with the plurality of containers 340, including containers 340a, 340b, 340c, and 340d. Each of the containers 340 includes applications as well as bins and libraries.

Referring still to FIG. 3, container 340 can include a container image for an application, A1, defined as a set of transformations {A} applied on top of existing image, I1. The existing image I1 in turn can be defined in terms of transformation set {B} applied over image I2, and so forth. At the very end of this transformation chain is a base image which does not need another parent image. This base image is defined in terms of a static input set of files with a well-defined operation set tailored for use with application containers running at a mount point within the filesystem provided by the host. In this illustrative implementation, the container image AI is a collection of files and not a bootable entity in itself.

Figure 4:
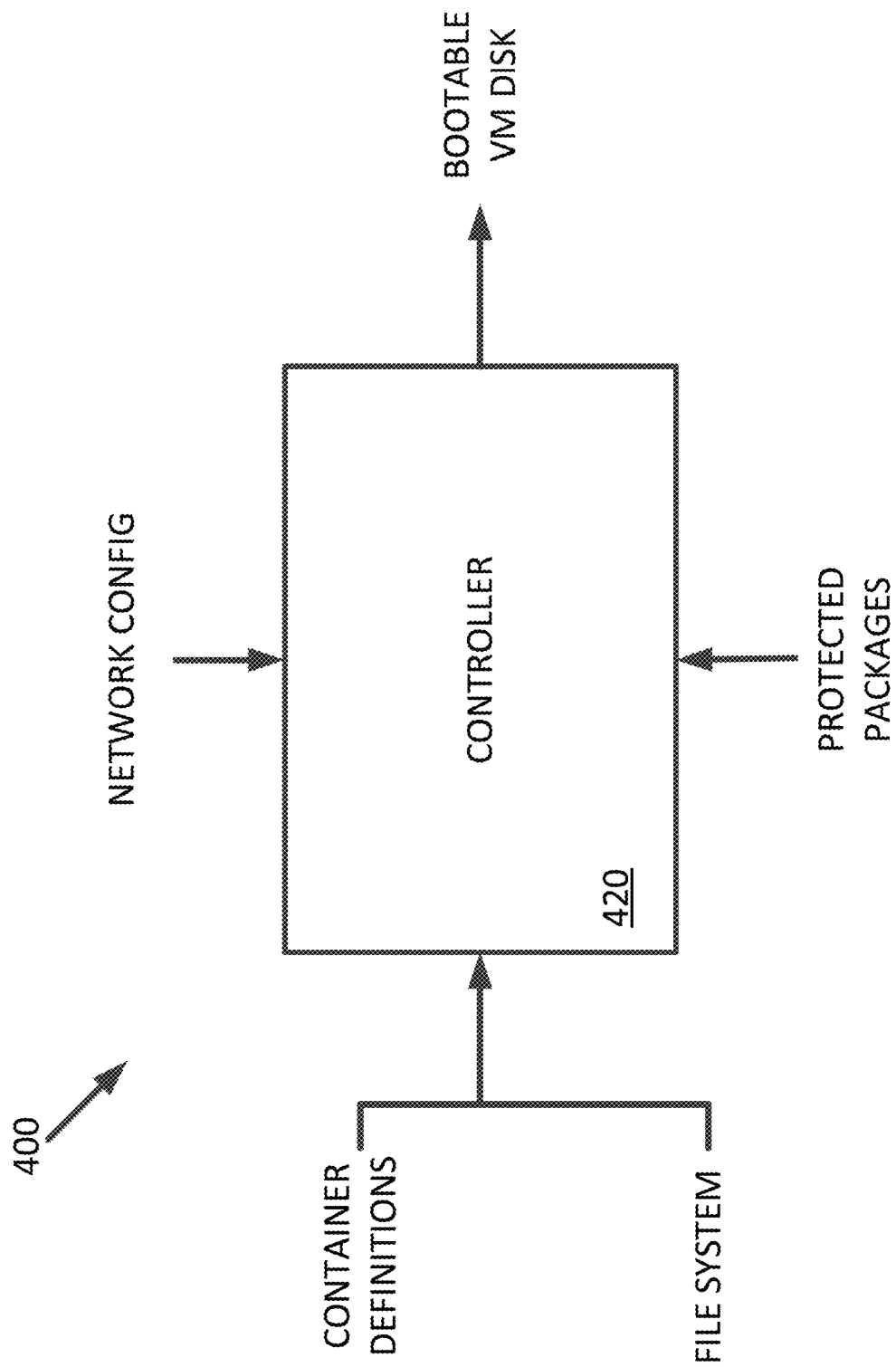
FIG. 4 is a block diagram of a system for creating a VM from a container file, in accordance with some implementations of the present disclosure.

FIG. 4 illustrates a system 400 for creating a VM from a container file in accordance with an illustrative implementation. In the system 400, a number of inputs are provided to a controller machine 420 to derive a bootable VM disk. Additional, fewer, or different inputs may be used depending on the implementation. One input includes an entire chain of container definitions including the definition of the base image. Another input includes a valid filesystem relevant for the container image. Yet another input includes a set of protected packages essential for a VM to boot but optional and, thus, not included in a container, such as a kernel, bootloader, init scripts, etc. Another input includes networking configuration for the application. The controller machine 420 receives these inputs and derives a file that represents a bootable VMdisk.

Figure 5:
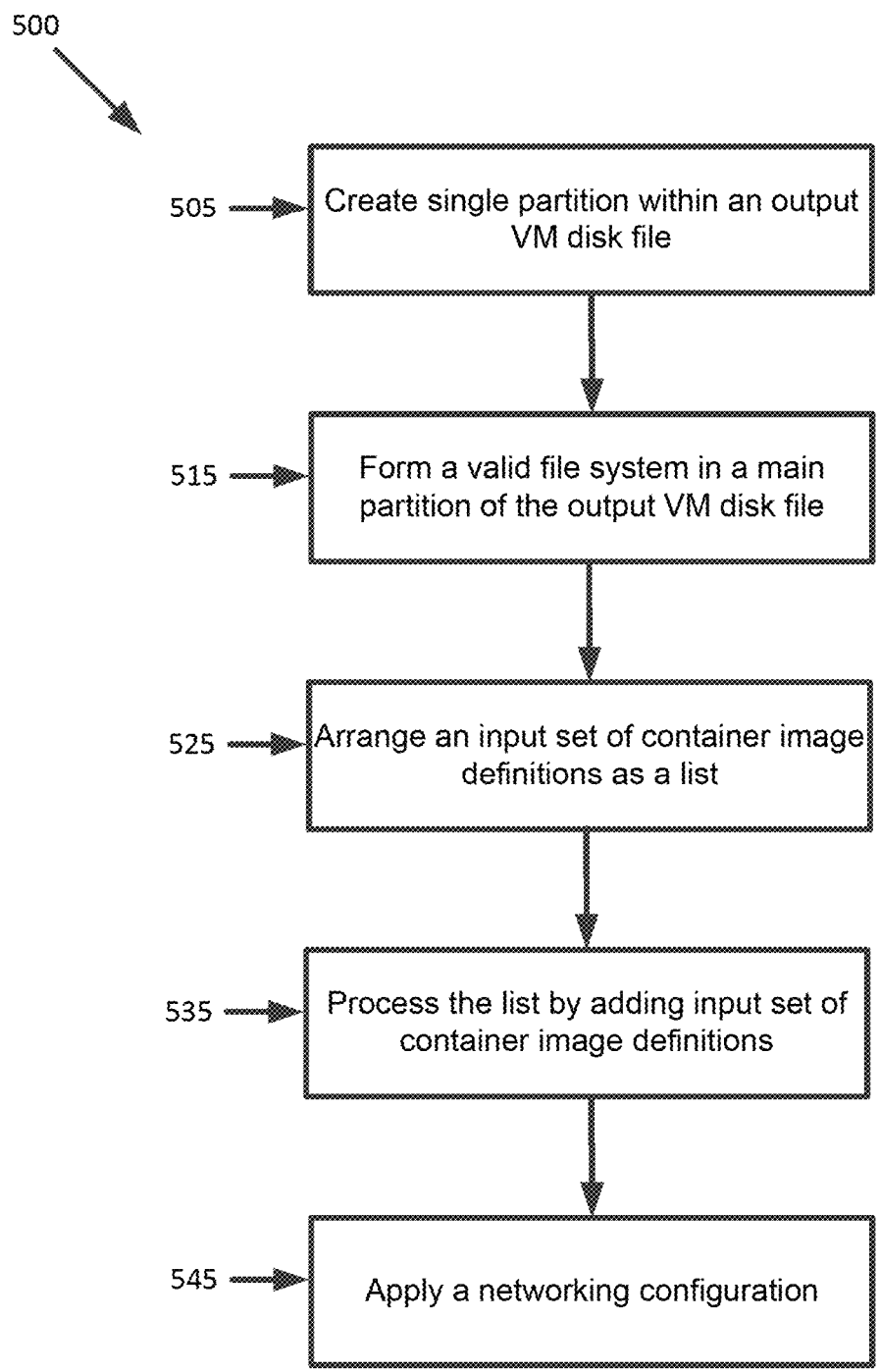
FIG. 5 is a flow diagram of a method of creating a VM from a container file, in accordance with some implementations of the present disclosure.

FIG. 5 illustrates a method 500 of creating a VM from a container file. Additional, fewer, or different operations may be performed depending on the implementation. In an operation 505 of an illustrative implementation, a controller machine creates a single partition within an output VM disk file. The single partition can include a master boot record and a partition table that describe the single partition. In an operation 515, the controller machine forms a valid file system in a main partition of the output VM disk file. The controller machine arranges an input set of container image definitions as a list in an operation 525. A base image forms a head of the list of container image definitions and subsequent images follow in the list.

In an operation 535, the controller machine 22 sequentially processes the list for each image by adding an input set of container image definitions to the output VM file at specific paths. Any operations pertaining to configuration/removal of files are allowed responsive to determining that the file is not a part of one of the protected packages. Any operations around networking setup are ignored.

The controller machine applies a final networking configuration over the output VM file in an operation 545. In at least one implementation, the controller machine checks for a presence in the output VM file of protected packages and, if missing, installs missing protected packages in the output VM file. The resultant image can now be booted as a VM on a supporting cloud setup.

Although the present disclosure has been described with respect to software applications, in other implementations, one or more aspects of the present disclosure may be applicable to other components of a virtual computing system.

It is also to be understood that in some implementations, any of the operations described herein may be implemented at least in part as computer-readable instructions stored on a computer-readable memory. Upon execution of the computer-readable instructions by a processor, the computer-readable instructions may cause a node to perform the operations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of creating a bootable virtual machine (VM) image for a container image, the method comprising:
creating, at a controller machine, a single partition within an output VM disk file;
forming, at the controller machine, a valid file system for a container image in a main partition of the output VM disk file;
arranging, at the controller machine, an input set of container image definitions as a list, wherein a base image forms a head of the list and subsequent images follow in the list;
processing, at the controller machine, the list for each image by adding the input set of container image definitions to the output VM file; and
applying, at the controller machine, a final networking configuration over the output VM file.

2. The method of claim 1, further comprising checking, at the controller machine, for a presence in the output VM file of protected packages and, if missing, installing missing protected packages in the output VM file.

3. The method of claim 1, wherein processing the list for each image comprises sequentially processing the list.

4. The method of claim 3, further comprising applying transformations, at the controller machine, for operations pertaining to configuration and removal of files.

5. The method of claim 4, wherein operations for networking setup are ignored.

6. The method of claim 1, wherein the single partition comprises a master boot record and a partition table.

7. The method of claim 1, wherein the container image is defined as a first set of transformations applied on top of a first existing image.

8. The method of claim 7, wherein the first existing image is defined as a second set of transformations applied over a second image.

9. The method of claim 8, wherein the container image includes a transformation chain of images having a base image at an end of the transformation chain.

10. The method of claim 9, wherein the base image is defined in terms of a static input set of files having an operations set.

11. An apparatus that creates a bootable virtual machine (VM) image from a container image, the apparatus comprising:
a controller; and
a memory coupled to the controller, wherein the memory stores programmed instructions and an output VM disk file;
wherein the controller includes programmed instructions to:
create a single partition within the output VM disk file;
form a valid file system in a main partition of the output VM disk file;
arrange an input set of container image definitions as a list, wherein a base image forms a head of the list and subsequent images follow in the list;
process the list for each image by adding the input set of container image definitions to the output VM file; and
apply a final networking configuration over the output VM file.

12. The apparatus of claim 11, wherein the controller further includes programmed instructions to check for a presence in the output VM file of protected packages and, if missing, install missing protected packages in the output VM file.

13. The apparatus of claim 11, wherein processing the list for each image comprises sequentially processing the list.

14. The apparatus of claim 13, wherein the controller further includes programmed instructions to apply transformations, at the controller machine, for operations pertaining to configuration and removal of files.

15. The apparatus of claim 11, wherein the single partition comprises a master boot record and a partition table.

16. The apparatus of claim 11, wherein the container image is defined as a first set of transformations applied on top of a first existing image.

17. The apparatus of claim 16, wherein the first existing image is defined as a second set of transformations applied over a second image.

18. The apparatus of claim 17, wherein the container image includes a transformation chain of images having a base image at an end of the transformation chain.

19. The apparatus of claim 18, wherein the base image is defined in terms of a static input set of files having an operations set.

20. A non-transitory computer readable storage medium to store a computer program configured to execute a method for creating a bootable virtual machine (VM) image from a container image, the method comprising:
creating a single partition within an output VM disk file;
forming a valid file system for a container image in a main partition of the output VM disk file;
arranging an input set of container image definitions as a list, wherein a base image forms a head of the list and subsequent images follow in the list;
processing the list for each image by adding the input set of container image definitions to the output VM file; and
applying a final networking configuration over the output VM file.

21. The non-transitory computer readable storage medium of claim 20, further comprising checking for a presence in the output VM file of protected packages and, if missing, installing missing protected packages in the output VM file.

22. The non-transitory computer readable storage medium of claim 20, wherein processing the list for each image comprises sequentially processing the list.

23. The non-transitory computer readable storage medium of claim 20, further comprising applying transformations, at the controller machine, for operations pertaining to configuration and removal of files.

\* \* \* \* \*